(12) United States Patent
Haugeberg et al.

(10) Patent No.: US 11,040,785 B2
(45) Date of Patent: Jun. 22, 2021

(54) DEVICES AND METHODS TO VERIFY TAIL ROTOR CROSS-HEAD POSITIONING

(71) Applicant: Bell Helicopter Textron Inc., Fort Worth, TX (US)

(72) Inventors: Chad R. Haugeberg, Arlington, TX (US); Bradley D. Linton, Mansfield, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 233 days.

(21) Appl. No.: 16/183,385

(22) Filed: Nov. 7, 2018

(65) Prior Publication Data

US 2019/0315495 A1 Oct. 17, 2019

Related U.S. Application Data

(60) Provisional application No. 62/658,205, filed on Apr. 16, 2018.

(51) Int. Cl.
*B64F 5/60* (2017.01)
*G01B 5/25* (2006.01)
*G01B 5/14* (2006.01)
*B64C 27/00* (2006.01)
*B64C 27/82* (2006.01)

(52) U.S. Cl.
CPC .............. *B64F 5/60* (2017.01); *B64C 27/008* (2013.01); *G01B 5/14* (2013.01); *G01B 5/25* (2013.01); *B64C 27/82* (2013.01)

(58) Field of Classification Search
CPC ........... B64F 5/60; B64C 27/008; G01B 3/30; G01B 3/306; G01B 3/50; G01B 5/14

USPC ............ 33/533, 645, 501.08, 501.09, 501.45
See application file for complete search history.

(56) References Cited

U.S. PATENT DOCUMENTS

| | | | | |
|---|---|---|---|---|
| 1,558,678 A | * | 10/1925 | Koenig | B44C 7/025 33/567 |
| 2,229,124 A | * | 1/1941 | Phillips | G01B 3/00 33/542 |
| 2,536,401 A | * | 1/1951 | Victor | G01B 3/30 33/567 |
| 3,201,873 A | * | 8/1965 | Bell | G01B 3/30 33/562 |

(Continued)

FOREIGN PATENT DOCUMENTS

| | | | |
|---|---|---|---|
| CA | 2775433 A1 * | 10/2012 | ............... G01B 3/30 |
| EP | 2628681 A1 | 8/2013 | |

(Continued)

OTHER PUBLICATIONS

European Search Report; 19151060.1; dated Jul. 22, 2019.
European Exam Report; 19151060.1; dated Aug. 6, 2019.

*Primary Examiner* — Christopher W Fulton
(74) *Attorney, Agent, or Firm* — Pramudji Law Group PLLC; Ari Pramudji

(57) ABSTRACT

A device to verify tail rotor cross-head positioning is disclosed. The device comprises a first portion and a second portion. The second portion may be adjoined to the first portion and comprises maximum and minimum surfaces configured to determine whether a yoke-measuring surface of a tail rotor yoke may be positioned between respective geometric planes of the maximum and minimum surfaces.

19 Claims, 6 Drawing Sheets

(56) References Cited

U.S. PATENT DOCUMENTS

| | | | | |
|---|---|---|---|---|
| 4,065,854 A | * | 1/1978 | Reed | G01B 3/30 33/567 |
| 4,584,774 A | * | 4/1986 | Link | G01B 3/30 33/202 |
| 5,042,161 A | * | 8/1991 | Hodge | A61B 5/1076 33/501.45 |
| 6,434,852 B1 | * | 8/2002 | Tarris | B23Q 17/003 33/640 |
| 2013/0230387 A1 | * | 9/2013 | Silva | B64F 5/10 415/170.1 |
| 2014/0124615 A1 | * | 5/2014 | Thompson | B64C 27/605 244/17.25 |
| 2016/0200430 A1 | | 7/2016 | Dickman et al. | |
| 2018/0319009 A1 | * | 11/2018 | Byrt | B25H 7/005 |

FOREIGN PATENT DOCUMENTS

| | | | | |
|---|---|---|---|---|
| FR | 2574924 A1 | * | 6/1986 | G01B 3/30 |
| WO | 9705017 A1 | | 2/1997 | |

* cited by examiner

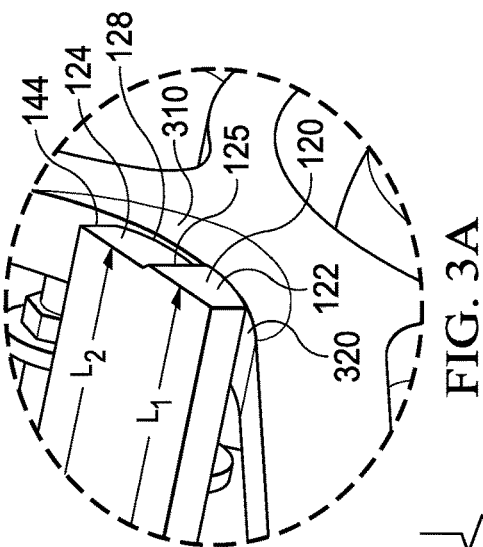
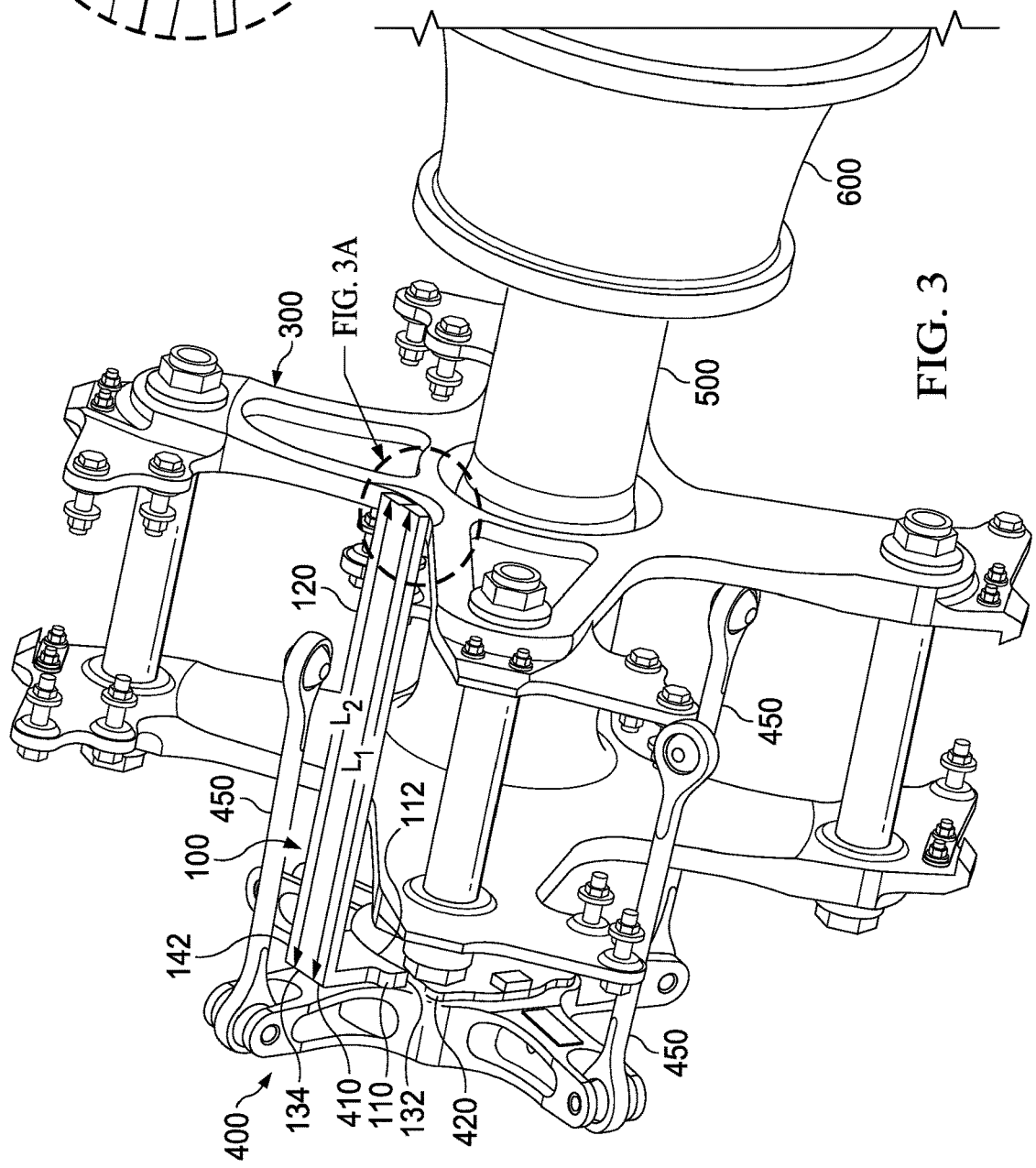
FIG. 3A
FIG. 3

DEVICES AND METHODS TO VERIFY TAIL ROTOR CROSS-HEAD POSITIONING

CROSS-REFERENCE TO RELATED APPLICATIONS

This application claims the benefit of priority under 35 U.S.C. § 119(e) to U.S. Provisional Application No. 62/658,205, filed on Apr. 16, 2018.

BACKGROUND

A rotorcraft (e.g., a helicopter) tail rotor system (i.e., tail rotor) may generate thrust in the same direction as a main rotor system's rotation to counter the torque effect created by the main rotor system. The thrust may allow the rotorcraft to hold steady in operation and not turn in circles. During assembly, replacements or repairs, mechanical and electrical tolerances may develop in various components of the tail rotor system. These tolerances include variations that "build up" in the dimensions of the various components and are problematic in excess, as the tolerances adversely impact a flight control system or a flight control computer's ability to accurately command based on the component's incorrect positioning. Hence, utmost care is given to proper tail rotor "rigging", which may include removing these tolerances and ensuring precise alignment of the tail rotor components.

However, conventional methods are difficult to perform and consistently replicate due to the sensitivity of the equipment involved. For example, if the rotorcraft components are even minimally displaced, an angle modification would occur, and the rigging would have to be redone. Also, known methods can often take hours or even days to complete both measurement as well as accurate adjustment.

SUMMARY

According to one implementation of the present disclosure, a device to verify tail rotor cross-head positioning includes a first portion and a second portion. The second portion may be adjoined to the first portion and comprises maximum and minimum surfaces configured to determine whether a yoke-measuring surface of a tail rotor yoke may be positioned between respective geometric planes of the maximum and minimum surfaces.

According to another implementation of the present disclosure, a method verifying tail rotor rigging of a rotorcraft, includes: determining, using a verification tool, whether a yoke-measuring surface of a tail rotor yoke that is coupled to an actuator using a control tube is positioned between respective geometric planes of maximum and minimum surfaces of the verification tool; adjusting the control tube; and determining, using the verification tool, whether the yoke-measuring surface of the tail rotor yoke is positioned between the respective geometric planes of the maximum and minimum surfaces of the verification tool.

The above-referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

FIG. 3 illustrates a perspective view of a verification tool in accordance with implementations of various techniques described herein.

FIG. 3A illustrates a view of maximum and minimum length extensions shown in FIG. 3;

DETAILED DESCRIPTION

In one or more examples of the present disclosure, verification devices 100, 200 and method 1000 are directed to tail rotor rigging, and more specifically, to tail rotor: cross-head (i.e., cross-head assembly, crosshead), yoke, control tube (i.e., actuator output tube, control rod), actuator yoke, and an actuator (i.e., actuator assembly, hydraulic actuator, triplex actuator) alignment in rotorcrafts.

Advantageously, various devices and methods described herein allow for rigging of collective control (e.g., corresponding to a distance between a cross-head and yoke). In one example, the collective control may be a tail rotor. But one skilled in the art will readily appreciate that the current invention is applicable to other types of rotor systems (e.g., propulsion propellers, main rotors, tilt rotors, etc.). In one implementation, verification may be performed by determining a positioning of the tail rotor cross-head, and in response to the determination, making adjustments, if necessary, to a corresponding adjustable control tube. The adjustment of the adjustable control tube ensures precise alignment of the tail rotor actuator with respect to the tail rotor cross-head and tail rotor yoke based on a particular control input.

In one implementation, the tail rotor control system may be a fly-by-wire system where a single hydraulic actuator may be commanded by triple redundant flight control computers. The hydraulic actuator may be electrically and hydraulically triplex with the piston/cylinder assemblies in parallel. However, the outputs are mechanically summed as part of the actuator assembly. The current invention may also be utilized with traditional flight controls such as mechanical or mechanical/hydraulic flight control systems.

The tail rotor control system may include a cross-head assembly that is coupled to the single triplex actuator (i.e., actuator). The cross-head may be co-axial to the actuator, and the two may be coupled by a control tube. One end of the control tube threads into the actuator yoke, and the other end may be clamped to a bearing inside the cross-head. The cross-head assembly may provide collective pitch to the tail rotor blades. Rotorcraft yaw-axis control may be provided by tail rotor collective control.

Figure 1:
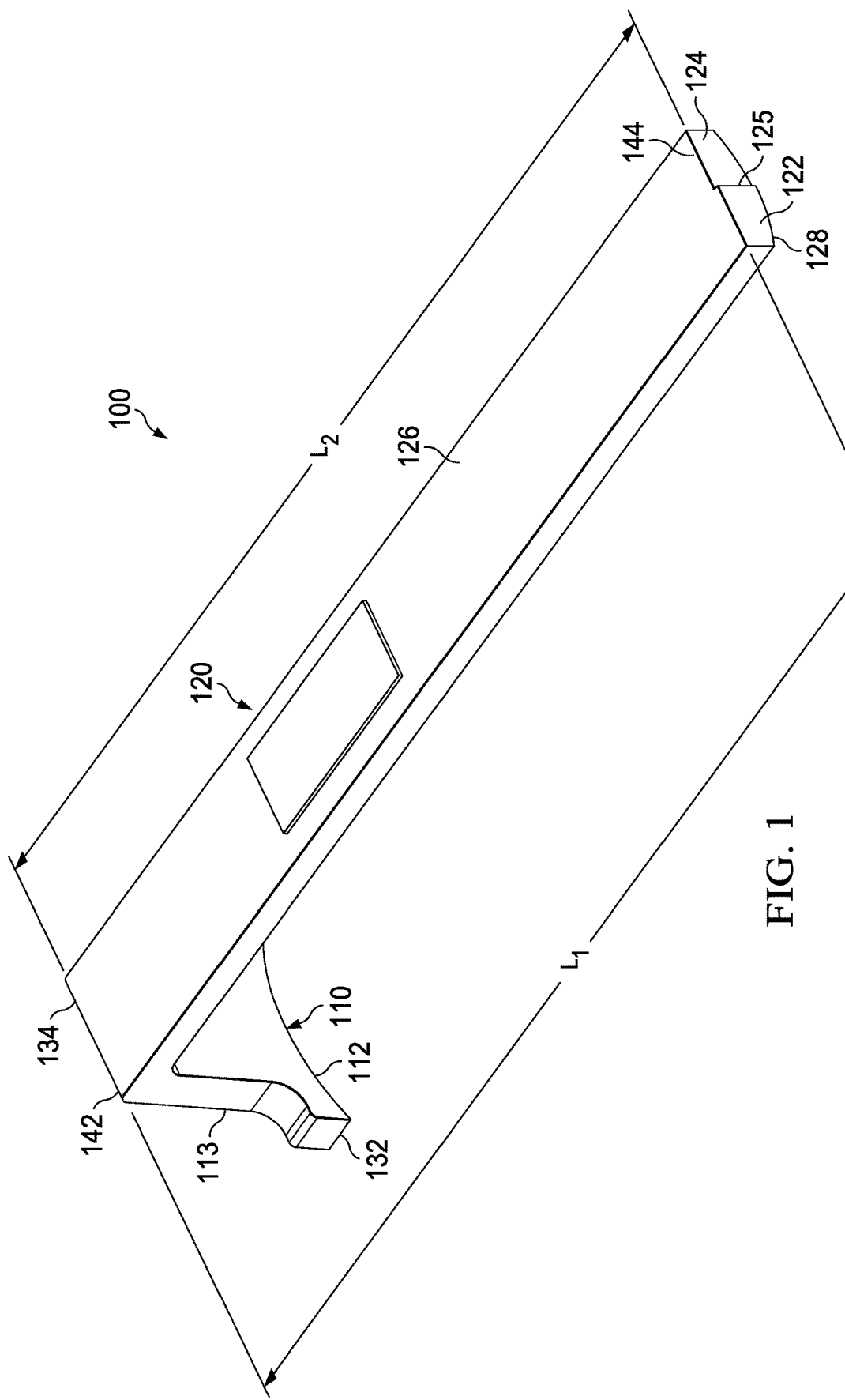
FIG. 1 illustrates a perspective view of a verification tool in accordance with implementations of various techniques described herein.
Figure 4:
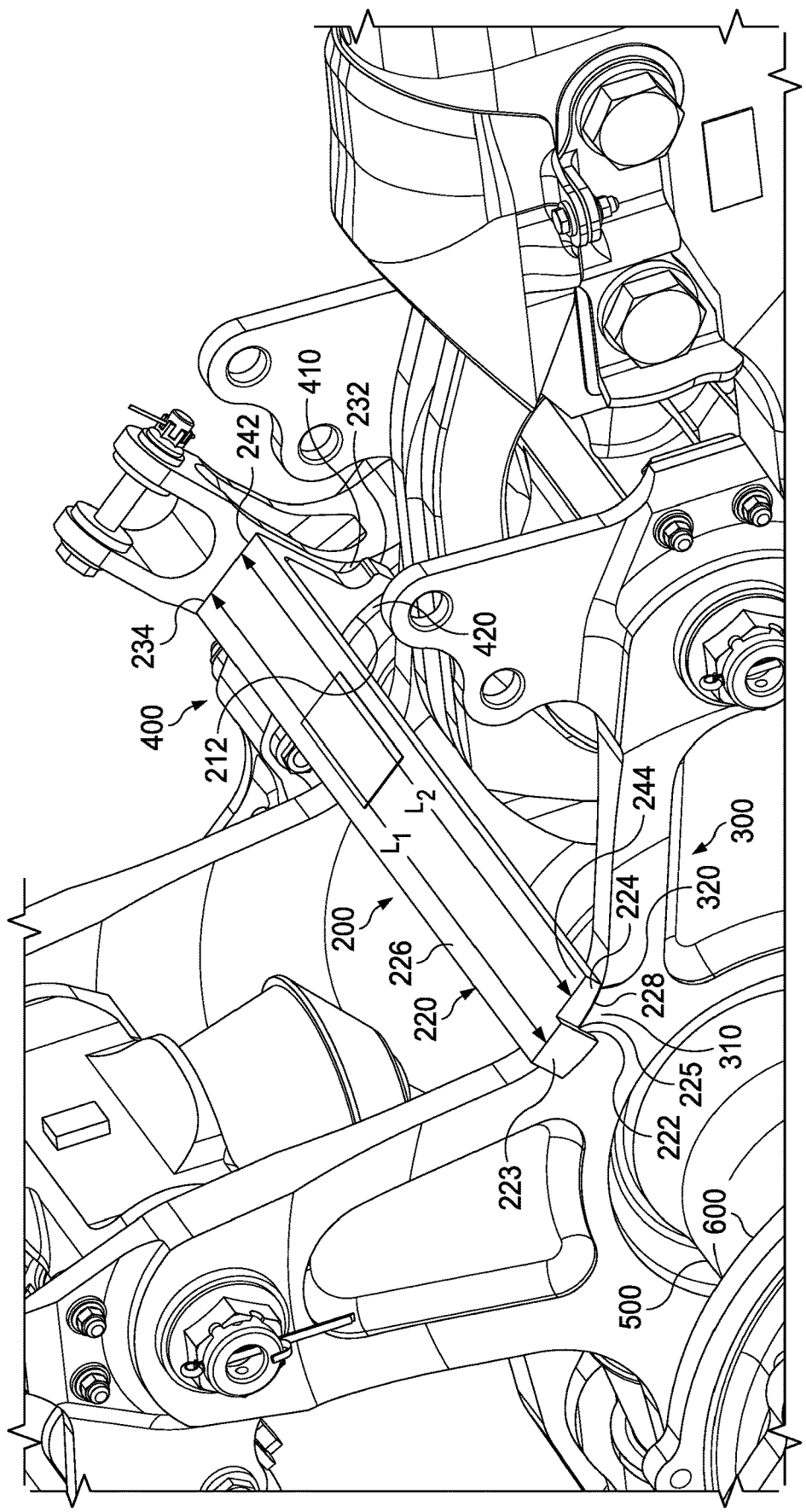
FIG. 4 illustrates a perspective view of a verification tool in accordance with implementations of various techniques described herein.

Referring to FIG. 1, a device 100 (i.e., verification tool, verification device) for verifying tail rotor cross-head positioning is shown. The verification tool 100 may include a first portion 110 and a second portion 120 (i.e., elongated portion). In one implementation, the second portion 120 may be adjoined to the first portion 110 and may include a maximum surface 122 and a minimum surface 124. As discussed in below paragraphs, the maximum and minimum surfaces 122, 124 may be used to determine whether an inboard surface 310 (i.e., yoke-measuring surface) of a tail rotor yoke 300 (e.g., as shown in FIGS. 3-4) is positioned between respective geometric planes of the maximum and minimum surfaces 122, 124, where the maximum and minimum surfaces 122, 124 may define the respective geometric planes. An interval between the respective geometric planes of the maximum and minimum surfaces 122, 124 may be a max/min range 125. The maximum surface 122 may correspond to a maximum suitable distance ($L_1$) (i.e., maximum interval, maximum length extension) between a mating surface 410 of a tail rotor cross-head 400 (e.g., as shown in FIGS. 3-4) and the inboard surface 310 of the tail rotor yoke 300. The minimum surface 124 may correspond to a minimum suitable distance between ($L_2$) (i.e., minimum interval, minimum length extension) between the mating surface 410 of the tail rotor cross-head 400 (i.e., cross-head) and the inboard surface 310 of the tail rotor yoke 300 (i.e., yoke). Advantageously, the verification tool 100 may be made of any stable material that is machinable within a given tolerance (e.g., a composite steel material).

In a particular implementation, the first portion 110 may be adjoined to the second portion 120 on a first end 142 of the second portion 120, and the maximum and minimum surfaces 122, 124 may be arranged on a second end 144 of the second portion 120. Moreover, the first and second ends 142, 144 may be on opposing ends of the second portion 120 of the verification tool 100.

In some examples, a positioning surface 113 located on the first portion 110 as well as the inboard surface 310 of the yoke 300 may be substantially parallel to the maximum and minimum surfaces 122, 124 of the second portion 120. As mentioned herein, the term "parallel", as applied to portions and/or surfaces, shall be defined as portions and/or surfaces progressing so that the interval between them remains the same, within an applicable manufacturing tolerance. For example, the positioning surface 113 and/or the inboard surface 310 of the tail rotor yoke 300 as being parallel to the maximum and minimum surfaces 122, 124 of the second portion 120 are included in respective geometric planes that are parallel in space within an applicable manufacturing tolerance.

The first portion 110 of the verification tool 100 may be configured to align a convex curvature 420 of the cross-head 400 (e.g., as shown in FIGS. 3-4). In some instances, the first portion 110 may include a concave curvature 112 that can be configured to align the convex curvature 420 of the cross-head 400 on a first end 132 of the first portion 110. Additionally, or alternatively, in some instances, the first portion 110 may include a positioning surface 113 that can be configured to contact a mating surface 410 of the cross-head 400. Also, in such cases and others, the first portion 110 may be adjoined to the second portion 120 on a second end 134 of the first portion 110.

In one implementation (e.g., as shown in FIG. 1), the maximum length extension (L1) of the second portion 120 may be of a greater length than that of a minimum length extension (L2) of the second portion 120. The maximum and minimum length extensions (L1, L2) may define maximum and minimum intervals, respectively, between the cross-head 400 (e.g., as shown in FIGS. 3-4) and the inboard surface 310 of the yoke 300 (e.g., as shown in FIGS. 3-4). Also, the maximum length extension (L1) may correspond to the maximum surface 122, and the minimum length extension (L2) may correspond to the minimum surface 124.

The second portion 120 of the verification tool 100 may include an upper surface 126 and a lower surface 128. In some cases, the upper surface 126 may be flat (i.e., level). In particular examples, the upper surface 126 of second portion 120 may be configured to align substantially perpendicular to the yoke 300 and/or the tail rotor cross-head 400. Also, in these cases as well as others, the lower surface 128 may have a convex curvature. In particular examples, the lower surface 128 of the second portion 120 may be configured to align to a concave curvature 320 of the yoke 300.

In some cases, the first portion 110 of the verification tool 100 may be exactly or approximately perpendicular to the upper and lower surfaces 126, 128 of the second portion 120. Further, the maximum and minimum surfaces 122, 124 may also be exactly or approximately perpendicular to the upper and lower surfaces 126, 128 of the second portion 120.

As illustrated in FIG. 1, the maximum and minimum surfaces 122, 124 may be positioned between the upper and lower surfaces 126, 128. Advantageously, the precise positioning of the maximum and minimum surfaces 122, 124 allow for proper evaluation of the inboard surface 310 of the yoke 300 relative to the cross-head 400.

Figure 2:
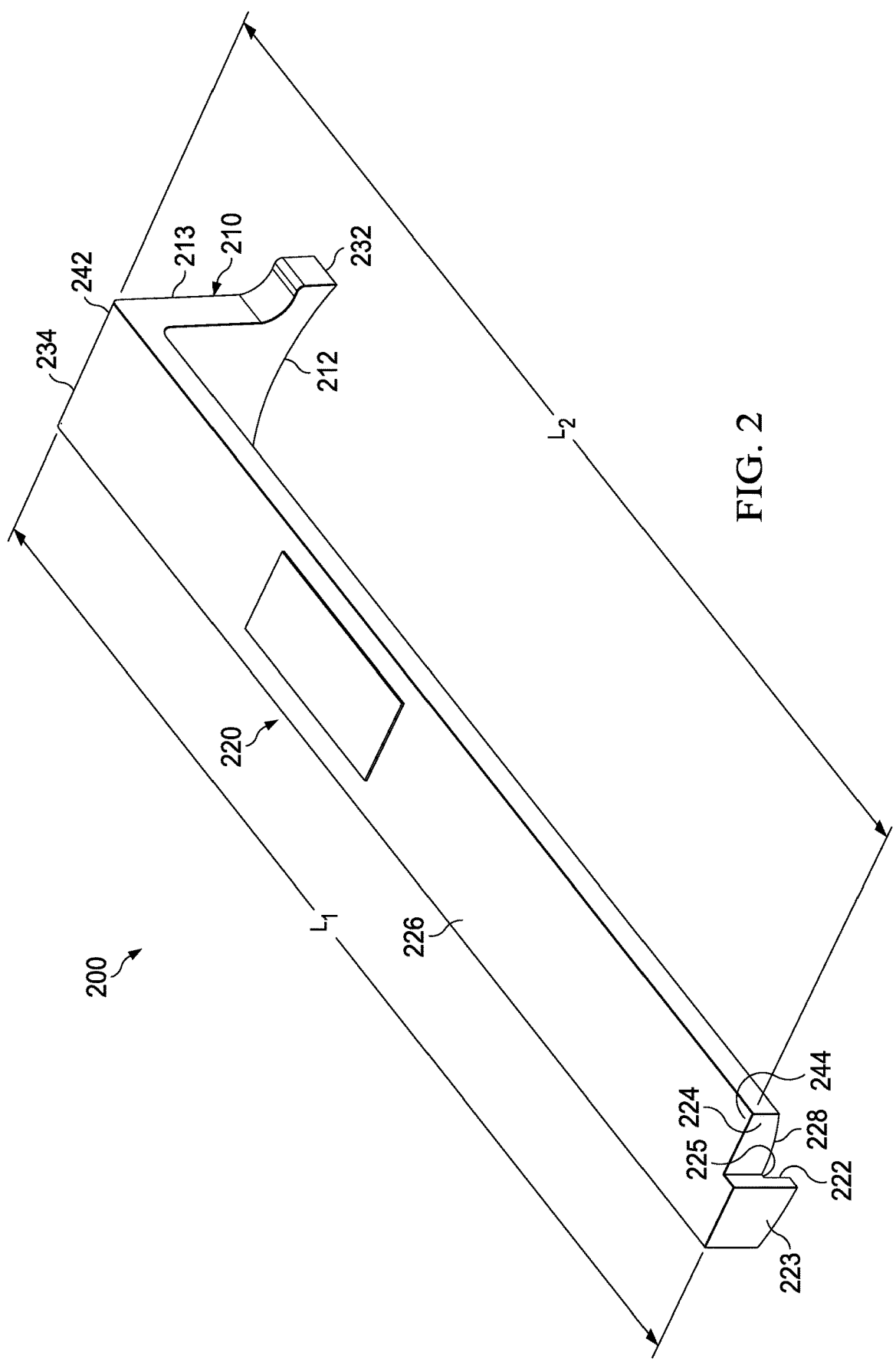
FIG. 2 illustrates a perspective view of a verification tool in accordance with implementations of various techniques described herein.

Referring to FIG. 2, a device 200 (i.e., verification tool, verification device) for verifying tail rotor cross-head positioning is shown. The verification tool 200 may include a first portion 210 and a second portion 220 (i.e., elongated portion). In one implementation, the second portion 220 may be adjoined to the first portion 210 and may include a maximum surface 222 and a minimum surface 224. As discussed in below paragraphs, the maximum and minimum surfaces 222, 224 may be used to determine whether an inboard surface 310 (i.e., yoke-measuring surface) of the yoke 300 (e.g., as shown in FIGS. 3-4) is positioned between respective geometric planes of the maximum and minimum surfaces 222, 224, where the maximum and minimum surfaces 222, 224 may define the respective geometric planes. An interval between the respective geometric planes of the maximum and minimum surfaces 222, 224 may be a max/min range 225. The maximum surface 222 may correspond to a maximum suitable distance ($L_1$) (i.e., maximum interval, maximum length extension) between the mating surface 410 of the cross-head 400 (e.g., as shown in FIGS. 3-4) and the inboard surface 310 of the yoke 300. The minimum surface 224 may correspond to a minimum suitable distance between ($L_2$) (i.e., minimum interval, minimum length extension) between the mating surface 410 of the cross-head 400 and the inboard surface 310 of the yoke 300. Advantageously, the verification tool 200 may be made of any stable material that is machinable within a given tolerance (e.g., a composite steel material).

In a particular implementation, the first portion 210 may be adjoined to the second portion 220 on a first end 242 of the second portion 220, and the maximum and minimum surfaces 222, 224 may be arranged on a second end 244 of the second portion 220. Moreover, the first and second ends 242, 244 may be on opposing ends of the second portion 220 of the verification tool 200.

In some examples, a positioning surface 213 located on the first portion 210 as well as the inboard surface 310 of the yoke 300 may be substantially parallel to the maximum and minimum surfaces 222, 224 of the second portion 220. As mentioned herein, the term "parallel", as applied to portions and/or surfaces, shall be defined as portions and/or surfaces progressing so that the interval between them remains the same, within an applicable manufacturing tolerance. For example, the positioning surface 213 and/or the inboard surface 310 of the yoke 300 as being parallel to the maximum and minimum surfaces 222, 224 of the second portion 220 are included in respective geometric planes that are parallel in space within an applicable manufacturing tolerance.

The first portion 210 of the verification tool 200 may be configured to align a convex curvature 420 of the cross-head 400 (e.g., as shown in FIGS. 3-4). In some instances, the first portion 210 may include a concave curvature 212 that can be configured to align the convex curvature 420 of the cross-head 400 on a first end 232 of the first portion 210. Additionally, or alternatively, in some instances, the first portion 210 may include a positioning surface 213 that can be configured to contact a mating surface 410 of the cross-head 400. Also, in such cases and others, the first portion 210 may be adjoined to the second portion 220 on a second end 234 of the first portion 210.

In one implementation (e.g., as shown in FIG. 1), the maximum length extension (L1) of the second portion 220 may be of a greater length than that of a minimum length extension (L2) of the second portion 220. The maximum and minimum length extensions (L1, L2) may define maximum and minimum intervals, respectively, between the cross-head 400 (e.g., as shown in FIGS. 3-4) and the inboard surface 310 of the yoke 300 (e.g., as shown in FIGS. 3-4). Also, the maximum length extension (L1) may correspond to the maximum surface 222, and the minimum length extension (L2) may correspond to the minimum surface 224.

The second portion 220 of the verification tool 200 may include an upper surface 226 and a lower surface 228. In some cases, the upper surface 226 may be flat (i.e., level). In particular examples, the upper surface 226 of second portion 220 may be configured to align substantially perpendicular to the tail rotor yoke 300 and/or the tail rotor cross-head 400. Also, in these cases as well as others, the lower surface 228 may have a convex curvature. In particular examples, the lower surface 228 of the second portion 220 may be configured to align to a concave curvature 320 of the yoke 300.

In some cases, the first portion 210 of the verification tool 200 may be exactly or approximately perpendicular to the upper and lower surfaces 226, 228 of the second portion 220. Further, the maximum and minimum surfaces 222, 224 may also be exactly or approximately perpendicular to the upper and lower surfaces 226, 228 of the second portion 220.

As illustrated in FIG. 2, while the minimum surface 224 may be positioned between the upper and lower surfaces 226, 228, the maximum surface 222 may include an overlap 223 (i.e., an overlap feature, an overhang). In certain implementations, the maximum surface 222 may be configured to overhang (i.e., partially cover) the inboard surface 310 of the tail rotor yoke 300, thus, facilitating efficient and accurate determinations of the inboard surface 320 positioning. Hence, if the overlap 223 were to prevent the verification tool 200 from adequately resting on the tail rotor yoke 300 as a result of the overlap's 223 placement, adjustments of the actuator output tube 500 would be desired. For example, in one particular implementation, if the inbound surface 310 "falls" at a length less than the maximum length extension L1, then the inbound surface would fall to the inside of the maximum surface 222. Thus, the verification tool 200 would "sit down" (i.e., fit appropriately) in a tail rotor assembly. Alternatively, if the yoke measuring surface "falls" at a length longer than the maximum length L1, then the inbound surface 310 would be beyond the maximum surface 222, and the overlap 223 would prevent the verification tool 200 from sitting properly in the tail rotor assembly. Accordingly, the precise positioning of the maximum and minimum surfaces 222, 224 allow for proper evaluation of the inboard surface 320 of the tail rotor yoke 300 relative to the cross-head 400.

Figure 5:
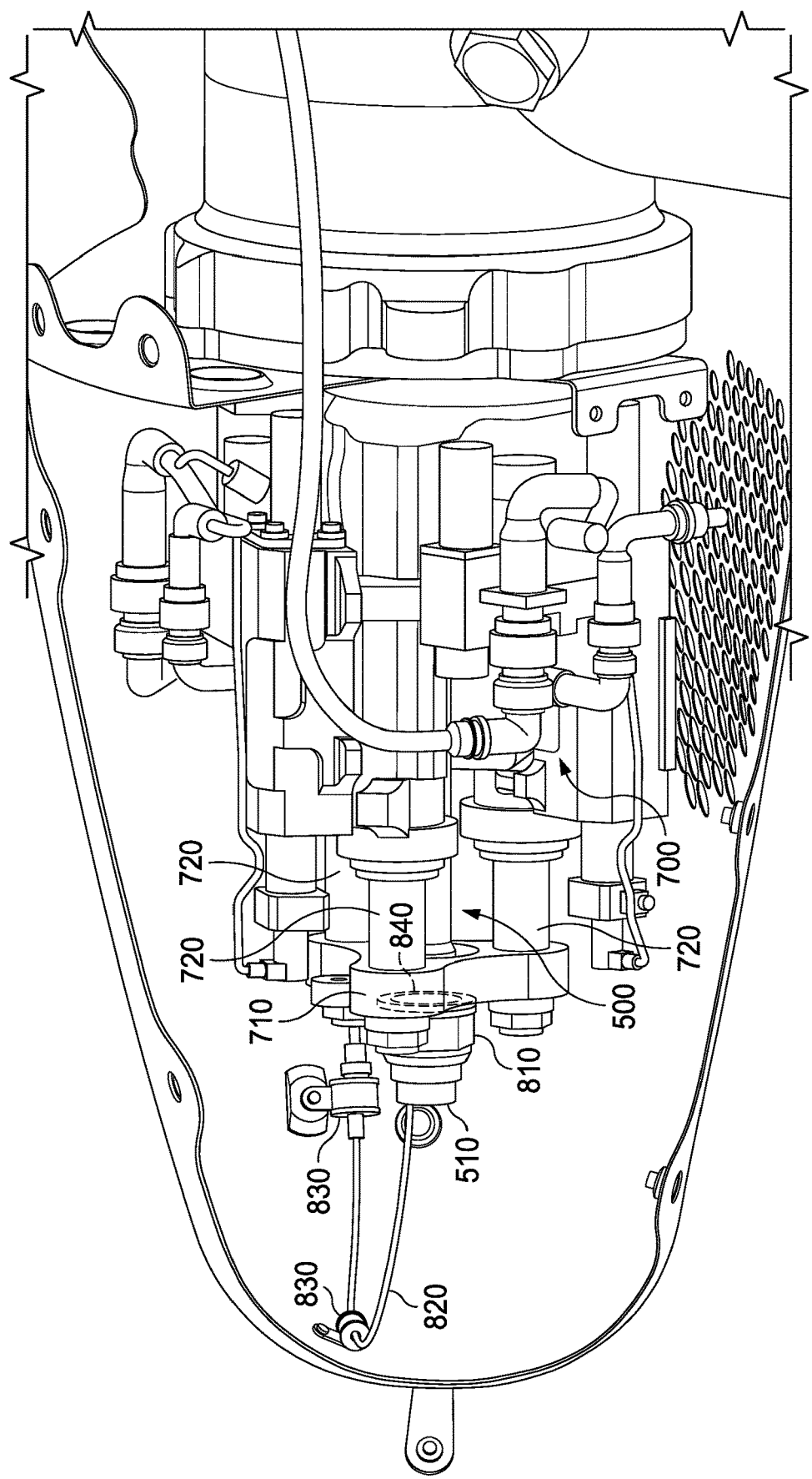
FIG. 5 illustrates a perspective view of a control tube and actuator assembly in accordance with implementations of various techniques described herein.

Referring to FIGS. 3 and 4, perspective views of the positioning of devices (i.e., verification tools) 100, 200, respectively, relative to a tail rotor mast including the yoke 300, the cross-head 400, the control tube 500, and the gearbox 600 are shown. FIG. 3 illustrates an example positioning of the verification tool 100, while FIG. 4 illustrates an example positioning of the verification tool 200. Referring to FIG. 5, a perspective view of the control tube 500 passing through a tail rotor actuator 700 is shown.

In a rotorcraft operation, flight control inputs from a pilot (or a computer-controlled flight control system) may be converted to actuation inputs for an actuator 700 to cause selective actuation of an actuator yoke 710 and a control tube 500 (i.e., actuator output tube). For instance, by extending and retracting the actuator yoke 710, the actuator 700 causes linear translation of the control tube 500, such that the cross-head 400 (e.g., as shown in FIGS. 3-4) is either extended or retracted. Moreover, the extension and/or retraction of the cross-head 400 may cause pitch links 450 (e.g., as shown in FIG. 3) to alter deflection angles of tail rotor blades (not shown).

As shown in FIGS. 3-4, and separately in FIG. 5, the control tube 500 may be coupled to the cross-head 400 at one end and coupled to the actuator yoke 710 of the actuator 700 on opposite sides of an empennage (not shown). For example, as shown in FIGS. 3-4, the control tube 500 may pass through, thereby coupling: the cross-head 400, the tail rotor yoke 300, and the gearbox 600. Upon passing through the gearbox 600, as shown in FIG. 5, the control tube 500 may thread through the actuator yoke 710 of the actuator 700 and align substantially parallel to the piston/cylinder assemblies 720 of the actuator 700.

In some cases, as shown in FIGS. 3-4, upon positioning, the positioning surface 113, 213 (on the first portion 110, 210 and the maximum and minimum surfaces 122, 222, 124, 224 of the verification tool 100, 200) may be configured to align substantially perpendicular to the control tube 500. Also, upon positioning, the second portion 120, 220 of the verification tool 100, 200 may be configured to align substantially parallel to the control tube 500.

The following is an example verification operation of tail rotor cross-head positioning of a rotorcraft. As illustrated in FIGS. 3-4, the verification device 100, 200 may be positioned on the tail rotor yoke 300 and tail rotor cross-head 400. For example, the concave curvature 112, 212 of the first end 110, 210 of the verification device 100, 200 may be positioned on the convex curvature 420 of the tail rotor cross-head 400. Additionally, or alternatively, the positioning surface 113, 213 on the first portion 110, 210 may be positioned to contact a mating surface 410 of the cross-head 400. Also, the convex curvature of the lower surface 128, 228 of the second portion 120, 220 may be positioned to the concave curvature 320 of the tail rotor yoke 300. Upon proper positioning of the verification device 100, 200, an evaluation can be made whether the inboard surface 310 of the tail rotor yoke 300 is positioned between respective geometric planes of maximum and minimum surfaces 122, 222, 124, 224 of the verification tool 100, 200. If the inboard surface 310 lies within the max/min range 125, 225, then the tail rotor cross-head 400 may be correctly positioned. If, however, the inboard surface 310 lies outside the max/min range 125, 225, then the tail rotor cross-head 400 may be deemed incorrectly positioned. Accordingly, the tail rotor actuator output tube (i.e., control tube) 500 may be adjusted based on the determination of the positioned verification tool 100, 200.

The following is an example verification and adjustment operation of tail rotor rigging of a rotorcraft. Prior to commencing the operation, the verification device 100, 200, along with aircraft mating surfaces, including the cross-head 400 and the tail rotor yoke 300 are cleaned to remove grease, oil, dirt, and other particulates. Also, this operation assumes that sufficient hydraulic and electrical power is provided to the rotorcraft from maintenance equipment, and that the collective lever is positioned such that a level cross-head condition is commanded.

To begin, a first determination is made whether an inboard surface 310 of a tail rotor yoke 300 that is coupled to an actuator 700 via a control tube 500 is positioned between respective geometric planes of maximum and minimum surfaces 122, 222, 124, 224 of the verification tool 100, 200.

The verification tool 100, 200 may be initially positioned on convex and concave curvatures 420, 320 of the cross-head 400 and the tail rotor yoke 300, respectively. After the initial positioning, an inboard surface 310 of the tail rotor yoke 300 may be evaluated to determine whether the inboard surface 310 lies between the respective geometric planes of maximum and minimum surfaces 122, 222, 124, 224 of the verification tool 100, 200.

If the inboard surface 310 lies within the max/min range 125, 225, then the tail rotor cross-head 400 may be correctly positioned. However, if the inboard surface 310 lies outside the max/min range 125, 225, then the tail rotor cross-head 400 may be deemed incorrectly positioned. Accordingly, in such cases, based on the determination of the positioned verification tool 100, 200, an adjustment of the control tube 500 would be desired.

Prior to adjusting the control tube 500, external hydraulic power may be turned off. Also, as shown in FIG. 5, electrical harnesses 820 are removed from clamps 830, and subsequently, disconnected from the control tube 500. Next, a washer tab (not shown) may be bent such that a nut 810 may be loosened. The nut 810 is then loosened and adjusted away from the actuator yoke 710 such that a lock washer 840 disengages from locking slots (not shown) of the control tube 500.

For proper adjustment of the control tube 500, wrenching flats 510 may be rotated such that the inboard surface 310 of the tail rotor yoke 300 lies between the respective geometric planes of maximum and minimum surfaces 122, 222, 124, 224 of the verification tool 100, 200. In one implementation, one full turn (i.e., one revolution) of the control tube 500 may correspond to a 0.083-inch displacement of the cross-head 400.

After adjusting the control tube 500, the lock washer 840 may be repositioned such that it engages the locking slots (not shown) and the nut 810 may be tightened. Next, the electrical harnesses 820 may be reconnected and installed into the clamps 830. Upon confirmation of adequate harness slack between the clamps 830 and the control tube 500 to accommodate an entire range of actuator motion, the external hydraulic power may be turned back on.

Subsequently, a second determination using the verification tool 100, 200, similar to the first determination as described herein, may again be performed on the cross-head 400 and the tail rotor yoke 300 to verify proper tail rotor rigging.

Figure 6:
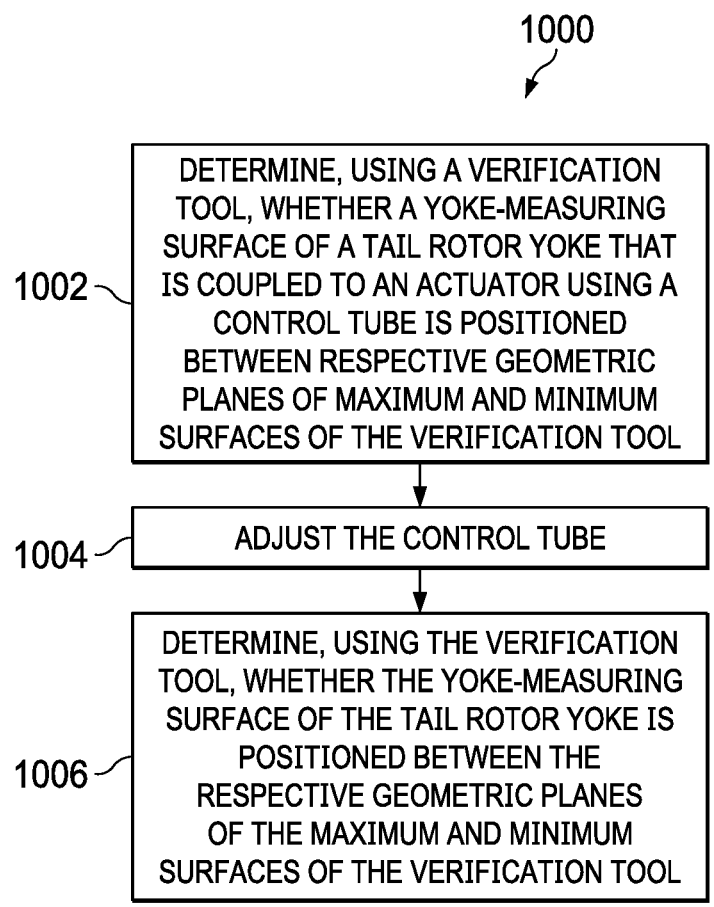
FIG. 6 is a flowchart of a method in accordance with implementations of various techniques described herein.

FIG. 6 is a flowchart of a method of verifying tail rotor rigging of a rotorcraft positioning of a rotorcraft in accordance with implementations of various techniques described herein. Method 1000 may be performed by a verification tool (e.g., a device such verification tools 100, 200 as described with reference to FIGS. 1 and 2), the yoke 300, the cross-head 400, the control tube 500, and the actuator 700 of FIGS. 1-5.

At 1002, method 1000 includes a first determination, using a verification tool, whether an inboard surface (i.e., a yoke-measuring surface) of a tail rotor yoke that is coupled to an actuator using a control tube is positioned between respective geometric planes of maximum and minimum surfaces of the verification tool. For example, as described with reference to FIGS. 1-4, the verification tools 100, 200 may be used to determine whether the inboard surface 310 lies between the respective geometric planes of maximum and minimum surfaces 122, 222, 124, 224 of the verification tool 100, 200.

At 1004, in response to the first determination, the control tube may be adjusted. For example, in response to the first determination, the control tube 500 may be adjusted. Moreover, wrench flats 510 may be rotated such that the inboard surface 310 of the tail rotor yoke 300 lies between the respective geometric planes of maximum and minimum surfaces 122, 222, 124, 224 of the verification tool 100, 200.

At 1006, a second determination is made, by the verification tool, whether the inboard surface of the tail rotor yoke is positioned between the respective geometric planes of maximum and minimum surfaces of the verification tool. For example, as described with reference to FIGS. 1-4, the verification tools 100, 200 may be used to confirm that the inboard surface 310 lies between the respective geometric planes of maximum and minimum surfaces 122, 222, 124, 224 of the verification tool 100, 200.

Each of the processes of illustrative method 1000 may be performed or carried out by a system integrator, a third party, and/or an operator (e.g., a customer). For the purposes of this description, a system integrator may include, without limitation, any number of manufacturers and major-system subcontractors; a third party may include, without limitation, any number of vendors, subcontractors, and suppliers; and an operator may be a leasing company, military entity, service organization, and so on.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according to the present disclosure are provided below.

Device(s) and method(s) shown or described herein may be employed during any one or more of the stages of the verification of cross-head positioning and/or tail rotor rigging of the device 100, the device 200, and the method 1000.

Different examples of the device(s) and method(s) disclosed herein include a variety of components, features, and functionalities. It should be understood that the various examples of the device(s) and method(s) disclosed herein may include any of the components, features, and functionalities of any of the other examples of the device(s) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A device to verify tail rotor cross-head positioning comprising:
   a first portion; and
   a second portion adjoined to the first portion and comprising maximum and minimum surfaces configured to determine whether a yoke-measuring surface of a tail rotor yoke is positioned between respective geometric planes of the maximum and minimum surfaces;
   wherein an upper surface of the second portion is flat, and wherein a lower surface of the second portion comprises a convex curvature.

2. The device of claim 1, wherein the first portion is adjoined to the second portion on a first end of the second portion, and the maximum and minimum surfaces are arranged on a second end of the second portion.

3. The device of claim 2, wherein the first and second ends are on opposing ends of the second portion.

4. The device of claim 1, wherein the first portion and the maximum and minimum surfaces are substantially parallel.

5. The device of claim 1, wherein the maximum and minimum surfaces are substantially parallel to a positioning surface located on the first portion.

6. The device of claim 1, wherein the first portion comprises a positioning surface and a concave curvature located proximate to a first end of the first portion.

7. The device of claim 6, wherein the concave curvature is configured to be aligned with a convex curvature of a tail rotor cross-head, the positioning surface is configured to be aligned with a mating surface of the tail rotor cross-head, and wherein the first portion is adjoined to the second portion on a second end of the first portion.

8. The device of claim 1, wherein the second portion defines maximum and minimum lengths, respectively, between a tail rotor cross-head and the tail rotor yoke.

9. The device of claim 8, wherein the maximum surface defines the maximum length between a mating surface of the tail rotor cross-head and the yoke-measuring surface of the tail rotor yoke, and the minimum surface defines the minimum length between the mating surface of the tail rotor cross-head and the yoke-measuring surface of the tail rotor yoke.

10. The device of claim 1, wherein the upper surface of the second portion is configured to align substantially perpendicular to a tail rotor cross-head and a tail rotor yoke, and wherein the lower surface of the second portion is configured to align to the tail rotor yoke.

11. The device of claim 10, wherein the first portion is substantially perpendicular to at least one of the upper and lower surfaces of the second portion.

12. The device of claim 10, wherein the maximum and minimum surfaces are substantially perpendicular to at least one of the upper and lower surfaces of the second portion.

13. The device of claim 10, wherein the maximum and minimum surfaces are positioned between the upper and lower surfaces of the second portion.

14. The device of claim 10, wherein the maximum surface is located on an overlap extending from the lower surface, wherein the overlap extends the maximum surface beyond the lower surface of the second portion.

15. The device of claim 1, wherein the maximum surface is located on an overlap extending from the lower surface of the second portion, and wherein the maximum surface is configured to overhang the yoke-measuring surface of the tail rotor yoke.

16. A method of verifying tail rotor rigging of a rotorcraft, comprising:
   determining, using a verification tool, whether a yoke-measuring surface of a tail rotor yoke that is coupled to an actuator using a control tube is positioned between respective geometric planes of maximum and minimum surfaces of the verification tool;
   positioning a concave curvature of the verification tool on a convex curvature of a tail rotor cross-head;
   positioning a positioning surface of the verification tool on a mating surface of the tail rotor cross-head;
   positioning a convex curvature of the verification tool on a concave curvature of the tail rotor yoke;
   and
   determining, using the verification tool, whether the yoke-measuring surface of the tail rotor yoke is positioned between the respective geometric planes of the maximum and minimum surfaces of the verification tool.

17. A method of verifying tail rotor rigging of a rotorcraft, comprising:
   determining, using a verification tool, whether a yoke-measuring surface of a tail rotor yoke that is coupled to an actuator using a control tube is positioned between respective geometric planes of maximum and minimum surfaces of the verification tool;

wherein the determination of the positioning of the yoke-measuring surface further comprises:
- positioning a concave curvature of the verification tool on a convex curvature of a tail rotor cross-head;
- positioning a positioning surface of the verification tool on a mating surface of the tail rotor cross-head;
- positioning a convex curvature of the verification tool on a concave curvature of the tail rotor yoke; and
- evaluating whether the yoke-measuring surface of the tail rotor yoke is positioned between the respective geometric planes of the maximum and minimum surfaces of the verification tool;

adjusting the control tube; and determining, using the verification tool, whether the yoke-measuring surface of the tail rotor yoke is positioned between the respective geometric planes of the maximum and minimum surfaces of the verification tool.

18. The method of claim 17, wherein the adjustment of the control tube is performed by rotating wrenching flats of the control tube.

19. The method of claim 18, wherein a revolution of the control tube corresponds to a 0.083-inch displacement of a tail rotor cross-head coupled to the tail rotor yoke.

* * * * *